US010812541B2

(12) United States Patent
Banerjee et al.

(10) Patent No.: US 10,812,541 B2
(45) Date of Patent: Oct. 20, 2020

(54) ACTUATION USING COLLABORATION MODELS IN AN INTERNET OF THINGS SETTING

(71) Applicant: International Business Machines Corporation, Armonk, NY (US)

(72) Inventors: Nilanjan Banerjee, Kolkata (IN); Ravi Kothari, New Delhi (IN); Amit Anil Nanavati, New Delhi (IN); Raghavendra Singh, New Delhi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 728 days.

(21) Appl. No.: 14/792,190

(22) Filed: Jul. 6, 2015

(65) Prior Publication Data

US 2017/0013029 A1 Jan. 12, 2017

(51) Int. Cl.
*H04L 29/06* (2006.01)

(52) U.S. Cl.
CPC .................................. *H04L 65/403* (2013.01)

(58) Field of Classification Search
CPC ........ H04L 67/12; H04L 69/24; H04L 65/403
See application file for complete search history.

(56) References Cited

U.S. PATENT DOCUMENTS

| | | | |
|---|---|---|---|
| 7,680,906 B2 | 3/2010 | Helander | |
| 8,422,994 B2 | 4/2013 | Rhoads et al. | |
| 8,620,682 B2 | 12/2013 | Bechtel et al. | |
| 8,671,099 B2 | 3/2014 | Kapoor et al. | |
| 8,874,266 B1 | 10/2014 | Francis, Jr. et al. | |
| 2002/0007510 A1 | 1/2002 | Mann | |
| 2006/0004703 A1 | 1/2006 | Spivack et al. | |
| 2006/0224318 A1 | 10/2006 | Wilson, Jr. et al. | |
| 2013/0178985 A1* | 7/2013 | Lombard | G05D 23/1904 700/276 |
| 2014/0169355 A1 | 6/2014 | Jing et al. | |
| 2014/0222730 A1 | 8/2014 | Vasseur et al. | |
| 2014/0241354 A1 | 8/2014 | Shuman et al. | |
| 2014/0244833 A1* | 8/2014 | Sharma | H04L 67/16 709/224 |
| 2015/0043426 A1* | 2/2015 | Aggarwal | H04L 12/2803 370/328 |
| 2015/0149563 A1* | 5/2015 | Shaw | H04L 65/40 709/206 |

(Continued)

*Primary Examiner* — Shean Tokuta
*Assistant Examiner* — Juan C Turriate Gastulo
(74) *Attorney, Agent, or Firm* — Ference & Associates LLC (57) ABSTRACT

Methods and arrangements for determining one or more actions needed to execute a task communicated to a first device in an Internet of Things. At a first device in the Internet of Things, there is received a communication associated with a task. A data store is consulted for data associated with the task, and thereupon there is determined the present capability of the first device for executing the task collaboratively with at least one other device in the Internet of Things. The at least one other device is communicated with, to assess capability for executing the task collaboratively with the at least one other device. There are thereupon determined one or more actions of the first device that need to be taken to execute the task. Other variants and embodiments are broadly contemplated herein.

15 Claims, 3 Drawing Sheets

(56) References Cited

U.S. PATENT DOCUMENTS

| | | | |
|---|---|---|---|
| 2015/0193697 A1 | 7/2015 | Vasseur et al. | |
| 2016/0105292 A1* | 4/2016 | Choi | H04L 51/02 |
| | | | 709/206 |
| 2016/0179462 A1* | 6/2016 | Bjorkengren | G06F 3/167 |
| | | | 704/275 |
| 2016/0315996 A1* | 10/2016 | Ha | H04L 12/2816 |
| 2017/0339231 A1* | 11/2017 | Lee | H04L 67/125 |
| 2017/0367132 A1* | 12/2017 | Sinha | H04L 12/2816 |

\* cited by examiner

ACTUATION USING COLLABORATION MODELS IN AN INTERNET OF THINGS SETTING

The Internet of Things (IOT), as generally known, has significant practical implications in many everyday settings. Consumers and others can benefit from devices (e.g., home-based appliances and items such as refrigerators, air conditioners, televisions, lights and lamps, etc.) that may have sensing, communication, and actuation capabilities to reach a desired state. The actuation may be partly or fully automated, and can serve a consumer (or benefit from his/her input) from a nearby or remote position.

Efforts have been made conventionally towards enabling actuation in an IOT setting especially when multiple devices are present. For instance, one device for influencing a given environmental factor within a house or apartment can be contextually aware of some other nearby device influencing the same or similar environmental factor. Conventionally each device would actuate independently when provided with a task to execute; such a task can essentially represent an action for accomplishing a predetermined objective in the setting at hand, e.g., lowering the temperature or increasing the brightness in a room.

BRIEF SUMMARY

In summary, one aspect of the invention provides a method of determining one or more actions needed to execute a task communicated to a first device in an Internet of Things, the method comprising: utilizing at least one processor to execute computer code that performs the steps of: at a first device in the Internet of Things, receiving a communication associated with the task; consulting a data store for data associated with the task; thereupon determining the present capability of the first device for executing the task collaboratively with at least one other device in the Internet of Things; communicating with the at least one other device to assess capability for executing the task collaboratively with the at least one other device; and thereupon determining one or more actions that need to be taken by the first device in executing the task.

Another aspect of the invention provides an apparatus for determining one or more actions needed to execute a task communicated to a first device in an Internet of Things, the apparatus comprising: at least one processor; and a computer readable storage medium having computer readable program code embodied therewith and executable by the at least one processor, the computer readable program code comprising: computer readable program code configured, at a first device in the Internet of Things, to receive a communication associated with the task; computer readable program code configured to consult a data store for data associated with the task; computer readable program code configured to thereupon determine the present capability of the first device for executing the task collaboratively with the at least one other device in the Internet of Things; computer readable program code configured to communicate with the at least one other device to assess capability for executing the task collaboratively with the at least one other device; and computer readable program code configured to thereupon determine one or more actions that need to be taken by the first device in executing the task.

An additional aspect of the invention provides a computer program product for determining one or more actions needed to execute a task communicated to a first device in an Internet of Things, the computer program product comprising: a computer readable storage medium having computer readable program code embodied therewith, the computer readable program code comprising: computer readable program code configured, at a first device in the Internet of Things, to receive a communication associated with the task; computer readable program code configured to consult a data store for data associated with the task; computer readable program code configured to thereupon determine the present capability of the first device for executing the task collaboratively with the at least one other device in the Internet of Things; computer readable program code configured to communicate with the at least one other device to assess capability for executing the task collaboratively with the at least one other device; and computer readable program code configured to thereupon determine one or more actions of the first device that need to be taken in executing the task.

A further aspect of the invention provides a method comprising: at a first device in the Internet of Things, receiving a communication associated with a specified task; consulting a device-specific catalog at the first device for data associated with the task; thereupon determining the present capability of the first device for executing the task collaboratively with at least one other device in the Internet of Things; communicating with the at least one other device to assess capability for executing the task collaboratively with the at least one other device; updating the device-specific catalog, with regard to the assessed capability for executing the task collaboratively with the at least one other device; thereupon determining one or more actions of the first device that need to be taken in executing the task; broadcasting the one or more actions to the at least one other device; participating in a voting protocol with the at least one other device; and directing actuation of the first device to assist in executing the task collaboratively with the at least one other device.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to FIG. 1. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an exemplary embodiment, most if not all of the process steps, components and outputs discussed with respect to FIG. 1 can be performed or utilized by way of a processing unit or units and system memory such as those indicated, respectively, at 16' and 28' in FIG. 3, whether on a server computer, a client computer, a node computer in a distributed network, or any combination thereof.

Broadly contemplated herein, in accordance with at least one embodiment of the invention, are methods and arrangements for achieving a specified task in a multi-entity (or multi-device) environment, where each device decides on whether to participate in accomplishing the task. Such a decision can be based on: matching the device's own capabilities to those required for accomplishing the task, the device's present load, and the capabilities of any other known entities (or devices) that may be able to accomplish the task. Moreover, a participating entity can modulate its action based on the number of qualifying entities that the participating entity is aware of, and optionally can choose to broadcast its action, thus allowing any listening entity to update its own catalog that may be present for capturing knowledge or data of other entities The features discussed above, and others, relating to at least one embodiment of the invention, will be better appreciated from the discussion which follows.

Figure 1:
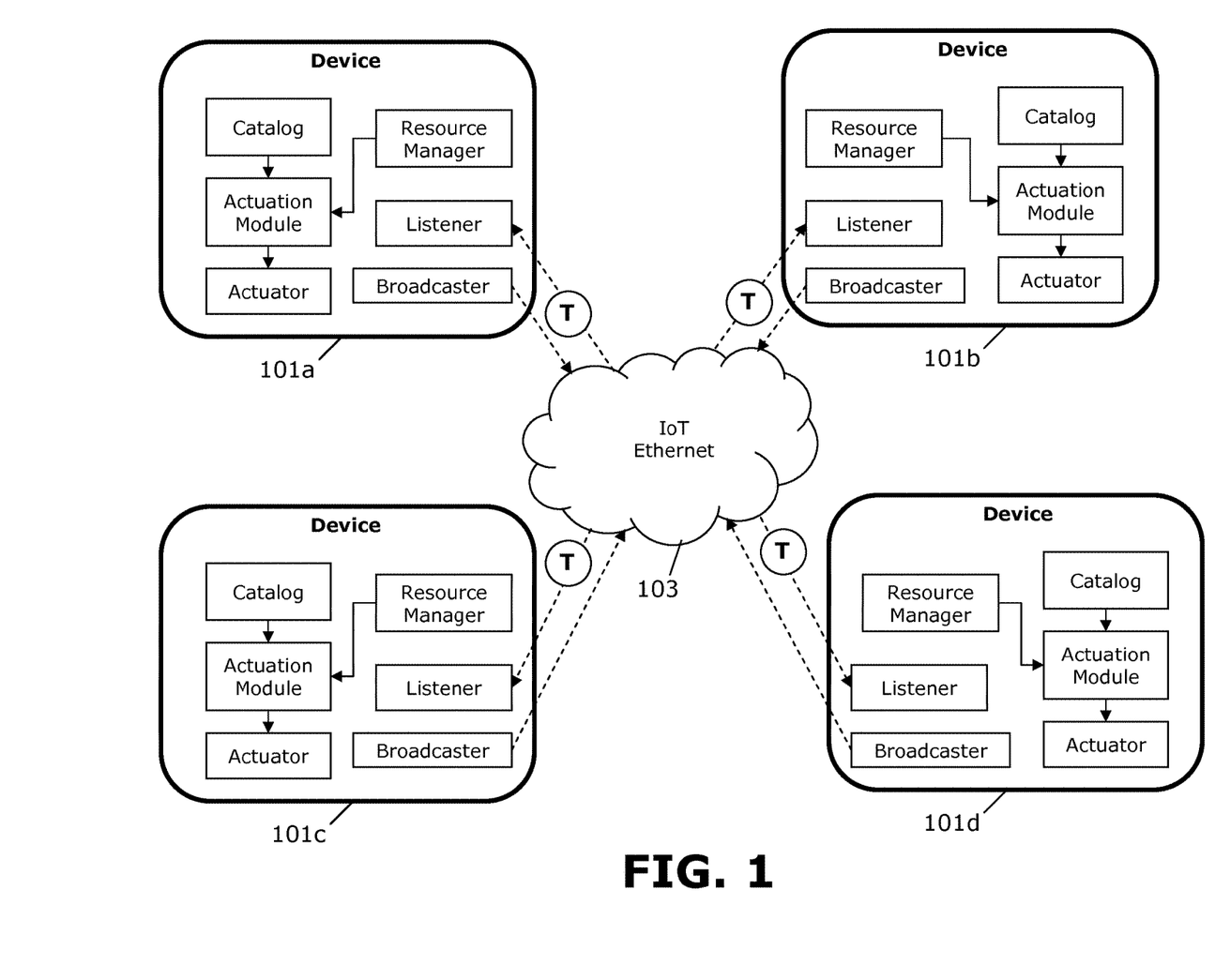
FIG. 1 schematically illustrates devices in an Internet of Things setting, in accordance with at least one embodiment of the invention.

FIG. 1 schematically illustrates several devices in an IOT setting, in accordance with at least one embodiment of the invention. As shown, each of several devices 101*a/b/c/d* (of which four are shown here merely by way of illustrative example), can intercommunicate over a network such as an IOT Ethernet 103. Ethernet 103 is shown here merely by way of illustrative example, and other manners of communication are possible. Particularly, it is not essential for communication to take place via a centralized processor or server inasmuch as devices 101*a/b/c/d* can autonomously communicate with one another by virtue of an available communications network that accommodates components associated with individual devices.

In accordance with at least one embodiment of the invention, each device 101*a/b/c/d* includes, as shown, listener and broadcaster components, a resource manager, a catalog, actuation model and an actuator. The catalog may constitute storage at the device for storing collected data and/or already-developed collaborative models. The listener serves to receive data or other input via the IOT Ethernet 103 (or other communications medium) while the broadcaster serves to broadcast data or other output via the IOT Ethernet 103 (or other communications medium). The resource manager serves to send data from the listener to the actuation module, which also can receive data from the catalog. The actuation module serves to undertake computations to control or guide the actuator, which may serve to actuate the device, or any portion thereof, to achieve a predetermined end; e.g., this could include turning the device on or off, adjusting a fan speed, moving the device or a portion thereof, etc. In a manner to be better understood from the ensuing discussion, one or more intended tasks (T) can be broadcast to the listener of any or all of the devices 101*a/b/c/d*.

In accordance with at least one embodiment of the invention, the catalog of each device 101*a/b/c/d* can store action tuples corresponding to <Entity, Property, Present State, Desired State, Action>. Such tuples can relate to the device itself, or to other devices which may have previously broadcast such tuples. A task T can then be broadcast to the listeners of the devices 101*a/b/c/d*, whereupon each device may independently decide to participate in the task or ignore it. As such, given a task to be performed (e.g., "lower the temperature", "increase brightness"), each interested device retrieves all matching action tuples from its own catalog (e.g., based on a match with respect to the "Property" field). The device then decides if the task T matches its own capabilities, based on keywords (or semantically related words as determined from an on-board ontology) used to describe the task. As is known, an ontology can represent a store of information which can assist in classification into predetermined categories, or in determining relationships between entities or objects.

In accordance with at least one embodiment of the invention, an action for executing a task may be modulated based on the number of entries retrieved by or made known to a listener of one of the devices 101*a/b/c/d*. For example, if one or more other devices can be used to reduce temperature, then a device's own action may be accordingly curtailed or reduced. In accordance with variant embodiments, more complex algorithms, stored in a catalog of one or more devices, can guide collaborative actions between devices here.

In accordance with at least one embodiment of the invention, the catalog of each device 101*a/b/c/d* can be set up so as to include information on relevant devices in a vicinity. In accordance with an illustrative example, two sets of keywords can be associated with each device, corresponding to variables that are controlled and affected by each device. Thus, an example of such entries can be as follows:

AC; controls: {temperature}; affects: {humidity}
Curtain; controls: {sunlight}; affects: {lighting, temperature}
Lamp; controls: {artificial-light}; affects: {lighting}

Each catalog may also include an ontology that captures relationships among all the variables and devices. (For example: sunlight-IS-A-lighting, artificial-light-IS-A-lighting, etc.) There may also be included an indication of user preferences that have been collected through input at an interface. (For example, a user may prefer curtains to be open, and AC to be switched off) Additionally, a catalog at any or all of the devices 101*a/b/c/d* may include a set of explicitly specified or pre-configured global optimization paradigm (e.g., variables and/or meta-rules). By way of example, such a paradigm could include directives to optimize energy expenditure, and/or resolve conflicts by voting (which could involve, e.g., ranking, where for a task a device may be preferred, or explicit user input). Furthermore, each catalog may include a template of pre-defined tasks. For example "reduce temperature by __", "more light in the room", wherein each task is associated with different variables and devices. Voting, for its part, could be supported as follows. Once a set of alternative actions is known, then participating devices can vote for a preferred alternative, where the most preferred alternative "wins". Such a mechanism could be used just in predetermined circumstances, e.g., to break a tie when the global and local goals are met by two or more alternatives alike. Voting can be undertaken in essentially any suitable known manner, such as objectively or numerically determining which device(s) may be the most ready or capable for participating in a given task, or submitting an ordinal preference based on predetermined criteria (e.g., criteria that balance operational efficiency across devices).

In accordance with at least one embodiment of the invention, a user can input a task using a user interface on a device or via using a separate input arrangement, e.g., an application on a tablet computer, smartphone or set-top box. Based on the task identified, the set of participating devices is identified; this can essentially involve assessing collaborative states between the devices, wherein such collaborative states represent functional, interdependent relationships for carrying out the task. The participating devices form a cohesive, functional group (which may be thought of as a "clique") using standardized networking transport protocols (e.g., TCP/HTTP) and start communicating with one another. Each device interprets the task, and outputs the action that it can take to accomplish it. Along with the action, it also can indicate any associated cost, e.g., the AC may indicate that it can perform a task of lowering temperature by 3 degrees, with an energy cost of $3, while a fan can provide its own associated cost. Each device chooses its own action(s) independently and, in the event of a conflict between devices, rank of device is used or the user is asked for explicit input to resolve the conflict. (See the foregoing discussion for examples in resolving conflicts.) The device may then undertake an action as determined from these steps.

By way of further elaboration, in accordance with at least one embodiment of the invention, an entity can identify itself as relevant to a particular task based on a match between keywords describing its own capabilities and keywords describing the task; a variant implementation may use semantic matching as opposed to keyword matching. A device may then retrieve all entries in its catalog that match keywords describing the task. For example, if the task was to reduce the temperature, a device (e.g., the thermostat) retrieves entries corresponding to itself and another device, e.g., the drapes. It is not essential for all entities that are able to accomplish a task to be present in a given catalog. For instance, a device may not initially be aware of all matching devices (in its own catalog) that could participate in accomplishing the task.

As such, in accordance with at least one embodiment of the invention, a device may choose to participate in a task, or ignore it, based on its present level of resources and its present load (e.g., other tasks it is involved in), or based on the number of other devices that may well be able to accomplish the task. A device may then modulate its action based on the number of other devices that can accomplish a task, e.g., a thermostat may reduce its setting by a third of the action present in an action tuple if there are two other devices that are able and prepared to perform the task. Via the broadcaster in a device, a device may choose to locally broadcast its action to other devices in order to permit such devices to update their catalogs. In accordance with a variant working embodiment, a device may choose to adapt its action (i.e., the action part of an action tuple) based on previous experience or outcomes in carrying out a task.

It can be appreciated from the foregoing that, in accordance with at least one embodiment of invention, a technical improvement is represented at least via methods and arrangements which undertake a specified task in a multi-entity (or multi-device) environment, where each device decides on whether to participate in accomplishing the task, and such a decision can be based on: matching the device's own capabilities to those required for accomplishing the task, the device's present load, and the capabilities of any other known entities (or devices) that may be able to accomplish the task.

Figure 2:
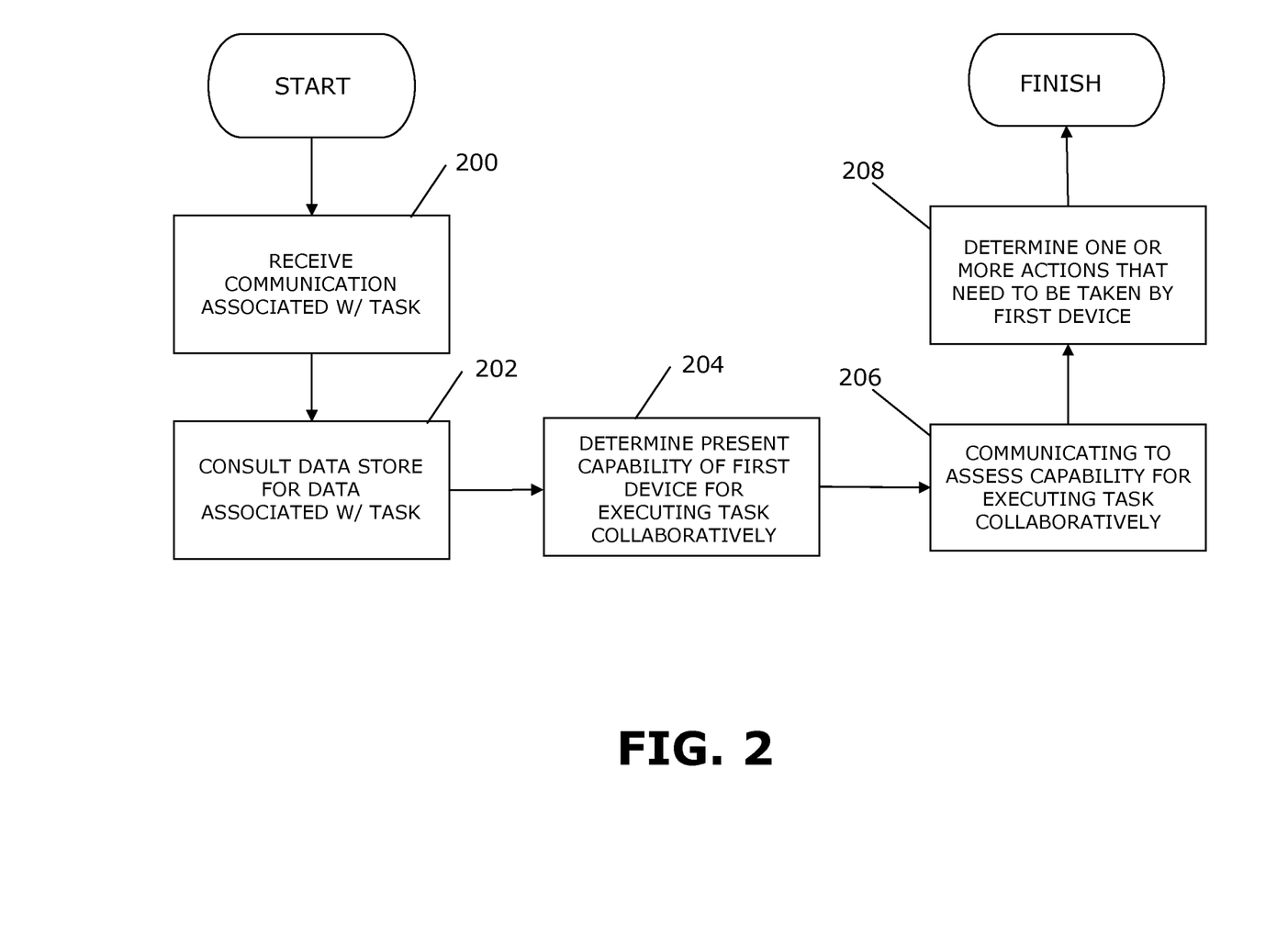
FIG. 2 sets forth a process more generally for determining one or more actions that need to be taken in executing a task communicated to a first device in an Internet of Things.

FIG. 2 sets forth a process more generally for determining one or more actions needed to execute a task communicated to a device in an Internet of Things, in accordance with at least one embodiment of the invention. It should be appreciated that a process such as that broadly illustrated in FIG. 2 can be carried out on essentially any suitable computer system or set of computer systems, which may, by way of an illustrative and non-restrictive example, include a system such as that indicated at 12' in FIG. 3. In accordance with an example embodiment, most if not all of the process steps discussed with respect to FIG. 2 can be performed by way of a processing unit or units and system memory such as those indicated, respectively, at 16' and 28' in FIG. 3.

As shown in FIG. 2, in accordance with at least one embodiment of the invention, at a first device in the Internet of Things, there is received a communication associated with a task (200). A data store is consulted for data associated with the task (202), and thereupon there is determined the present capability of the first device for executing the task collaboratively with at least one other device in the Internet of Things (204). The at least one other device is communicated with, to assess capability for executing the task collaboratively with the at least one other device (206). There are thereupon determined one or more actions of the first device that need to be taken in executing the task (208).

Figure 3:
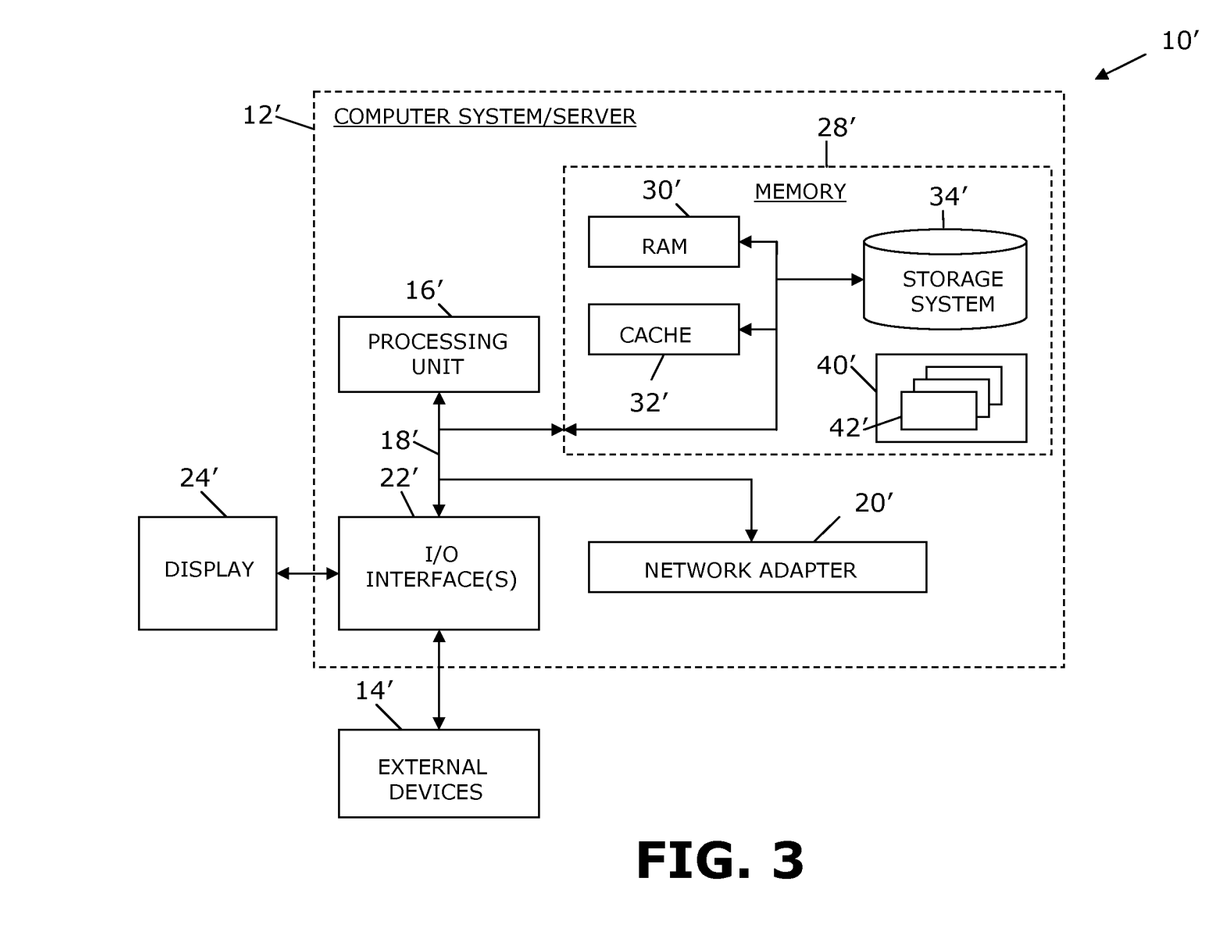
FIG. 3 illustrates a computer system.

Referring now to FIG. 3, a schematic of an example of a computing node is shown. Computing node 10' is only one example of a suitable computing node and is not intended to suggest any limitation as to the scope of use or functionality of embodiments of the invention described herein. Regardless, computing node 10' is capable of being implemented and/or performing any of the functionality set forth hereinabove. In accordance with embodiments of the invention, computing node 10' may be part of a cloud network or could be part of another type of distributed or other network (e.g., it could represent an enterprise server), or could represent a stand-alone node.

In computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' by way of example, and not limitation, as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of determining one or more actions needed to execute a task, said method comprising:

utilizing at least one processor to execute computer code that performs the steps of:

receiving a communication associated with the task at a first device in an Internet of Things, wherein the Internet of Things comprises a plurality of interconnected devices including the first device;

consulting a data store located at the first device for data associated with the task;

thereupon determining the present capability of the first device for executing the task collaboratively with at least one other device in the Internet of Things, wherein the present capability is reflective of a number of existing tasks the first device is completing;

communicating, based on the present capability of the first device and to the at least one other device, an action for performing the task that can be taken by the first device and an energy cost associated with the action;

receiving, from the at least one other device, another action for performing the task that can be taken by the at least one other device and the energy cost associated with the another action, wherein the receiving another action comprises the at least one other device determining at least one action for performing the task that can be performed by the at least one other device by matching actions for performing the task with capabilities of the at least one other device;

modulating, based on the receiving, the action that can be taken by the first device to a lesser action responsive to identifying that the at least one other device is associated with two or more other devices capable of performing other actions to execute the task, wherein the modulating comprises reducing the energy needed to perform the action by the first device by a percent proportional to the two or more other devices capable of performing the other actions; and collaboratively executing, via the lesser action from the first device and the other actions from the two or more other devices, the task.

2. The method according to claim 1, comprising broadcasting the one or more actions to the at least one other device.

3. The method according to claim 1, wherein said maintaining comprises storing keywords relating to the task.

4. The method according to claim 1, wherein the device-specific catalog comprises data for feeding into a collaborative device model.

5. The method according to claim 1, wherein the device-specific catalog stores action tuples.

6. The method according to claim 5, wherein said determining of one or more actions of the first device comprises consulting a predetermined global optimization paradigm.

7. The method according to claim 5, wherein said determining of one or more actions of the first device comprises participating in a voting protocol with the at least one other device.

8. An apparatus for determining one or more actions needed to execute a task, said apparatus comprising:

at least one processor; and a computer readable storage medium having computer readable program code embodied therewith and executable by the at least one processor, the computer readable program code comprising:

computer readable program code configured to receive a communication associated with the task at a first device in an Internet of Things, wherein the Internet of Things comprises a plurality of interconnected devices including the first device;

computer readable program code configured to consult a data store located at the first device for data associated with the task;

computer readable program code configured to thereupon determine the present capability of the first device for executing the task collaboratively with the at least one other device in the Internet of Things, wherein the present capability is reflective of a number of existing tasks the first device is completing;

computer readable program code configured to communicate, based on the present capability of the first device and to the at least one other device, an action for performing the task that can be taken by the first device and an energy cost associated with the action;

computer readable program code configured to receive, from the at least one other device, another action for performing the task that can be taken by the at least one other device and the energy cost associated with the another action, wherein the receiving another action comprises the at least one other device determining at least one action for performing the task that can be performed by the at least one other device by matching actions for performing the task with capabilities of the at least one other device;

computer readable program code configured to modulate, based on the receiving, the action that can be taken by the first device to a lesser action responsive to identifying that the at least one other device is associated with two or more other devices capable of performing other actions to execute the task, wherein the modulating comprises reducing the energy needed to perform the action by the first device by a percent proportional to the two or more other devices capable of performing the other actions; and computer readable program code configured to collaboratively execute, via the lesser action from the first device and the other actions from the two or more other devices, the task.

9. A computer program product for determining one or more actions needed to execute a task communicated to a first device in an Internet of Things, said computer program product comprising:

a computer readable storage medium having computer readable program code embodied therewith, the computer readable program code comprising:

computer readable program code configured to receive a communication associated with the task at a first device in an Internet of Things, wherein the Internet of Things comprises a plurality of interconnected devices including the first device;

computer readable program code configured to consult a data store located at the first device for data associated with the task;

computer readable program code configured to thereupon determine the present capability of the first device for executing the task collaboratively with the at least one other device in the Internet of Things, wherein the present capability is reflective of a number of existing tasks the first device is completing;

computer readable program code configured to communicate, based on the present capability of the first device and to the at least one other device, an action for performing the task that can be taken by the first device and an energy cost associated with the action;

computer readable program code configured to receive, from the at least one other device, another action for performing the task that can be taken by the at least one other device and the energy cost associated with the another action, wherein the receiving another action comprises the at least one other device determining at least one action for performing the task that can be performed by the at least one other device by matching actions for performing the task with capabilities of the at least one other device;

computer readable program code configured to modulate, based on the receiving, the action that can be taken by the first device to a lesser action responsive to identifying that the at least one other device is associated with two or more other devices capable of performing other actions to execute the task, wherein the modulating comprises reducing the energy needed to perform the action by the first device by a percent proportional to the two or more other devices capable of performing the other actions; and computer readable program code configured to collaboratively execute, via the lesser action from the first device and the other actions from the two or more other devices, the task.

10. The computer program product according to claim 9, comprising computer readable program code configured to broadcast the one or more actions to the at least one other device.

11. The computer program product according to claim 9, wherein the maintaining comprises storing keywords relating to the task.

12. The computer program product according to claim 9, wherein the device-specific catalog comprises data for feeding into a collaborative device model.

13. The computer program product according to claim 9, wherein the device-specific catalog stores action tuples.

14. The computer program product according to claim 13, wherein the determining of one or more actions of the first device comprises consulting a predetermined global optimization paradigm.

15. The computer program product according to claim 13, wherein the determining of one or more actions of the first device comprises participating in a voting protocol with the at least one other device.

* * * * *